United States Patent [19]

Fitch et al.

[11] Patent Number: 4,577,223

[45] Date of Patent: Mar. 18, 1986

[54] SYNTHETIC D.C. RESTORATION OF A.C. COUPLED SIGNALS

[75] Inventors: Robert C. Fitch, Roseville; Pat M. Narendra, Mapleplain, both of Minn.

[73] Assignee: Honeywell Inc., Minneapolis, Minn.

[21] Appl. No.: 447,906

[22] Filed: Dec. 8, 1982

[51] Int. Cl.⁴ .............................................. H04N 5/33
[52] U.S. Cl. .................................... 358/113; 358/223; 382/55
[58] Field of Search ...................... 358/113, 213, , 160, 358/166, 223; 382/54, 55

[56] References Cited

U.S. PATENT DOCUMENTS

| | | | |
|---|---|---|---|
| 3,634,619 | 1/1972 | Astley | 358/223 |
| 3,751,586 | 8/1973 | Johansson | 358/113 |
| 3,790,706 | 2/1974 | Gubala et al. | 358/169 |
| 3,798,366 | 3/1974 | Hunt et al. | 358/113 |
| 3,974,328 | 8/1976 | Thomas et al. | 358/140 |
| 4,121,248 | 10/1978 | Coale, Jr. | 358/113 |
| 4,297,680 | 10/1981 | Koeman | 358/138 |

Primary Examiner—Edward L. Coles, Sr.
Attorney, Agent, or Firm—William T. Udseth

[57] ABSTRACT

First and second signals are selected from a plurality of sequentially fed, a.c. coupled signals. A difference signal which is the difference between the first and second signal is generated. The times during which the first signal exceeds the second, and during which the second signal exceeds the first, are determined. The larger of these two times is selected and an average of the difference signal over this larger time is generated. The average is added to the second signal. Means for implementing these steps, including an all analog embodiment are disclosed.

11 Claims, 8 Drawing Figures

SYNTHETIC D.C. RESTORATION OF A.C. COUPLED SIGNALS

BACKGROUND OF THE INVENTION

1. Field of the Invention

This invention relates to methods and means for synthetic D.C. restoration of a.c. coupled electronic signals. Parallel scanning detector arrays, and particularly thermal imaging detector arrays are advantageously employed with this invention.

2. Prior Art

When an electric signal from a detector is a.c. coupled to an electrical processing system, the D.C. component in the signal is deleted. For a plurality of a.c. coupled detectors, the average value of the remaining a.c. component is the same for each detector.

A typical parallel scanning device 10 (see FIG. 1) includes a detector array 11 having a plurality of detectors 12 which are vertically disposed and which scan horizontally in unison across a field of view (FOV). Each of detectors 12 produces an electronic signal generated from scanning a separate line in the FOV. The scan time for each detector 12 is the same and detectors 12 scan simultaneously. The output from each detector 12 is a.c. coupled to a processing system 14. The output from processing system 14 affects an imaging device, such as video screen 15.

Scan line 18 includes three portions, 20, 22 and 24. Portions 20 and 22 correspond to background images whereas portion 24 corresponds to a hot spot. Since the average value 26 of scan line 16 and 18 is the same (average value 26 is set equal to zero in FIGS. 2 and 4), portions 20 and 22 of scan line 18 must be shifted or offset below average value 26 to compensate for hot spot 24. This shift causes scan line 18 to appear darker than it should be, resulting in a streak on screen 15. In order to compensate for this shift, it is necessary to estimate the shift and add it to scan line 18. This compensation process is called synthetic D.C. restoration.

Heretofore no effective system has been disclosed for easily estimating the shift of a.c. coupled signals from a parallel scanning detector system and for restoring the same. In particular, no analog electronic processing system has been proposed for providing synthetic D.C. restoration. Analog processing offers advantages over digital processing in that no analog/digital conversion is required, no complex histogramming is nec essary and, thus, real time implementation is facilitated.

SUMMARY OF THE INVENTION

A sequence of a.c. coupled signals, all of equal duration, are processed by selecting a first signal, selecting a second signal, generating a difference signal which is the difference between the first and second signals, determining the first time during the signal time when the first signal exceeds the second signal, determining a second time during the signal time when the second signal exceeds the first signal, selecting the larger of the first or second times, generating an average value of the difference signal during the larger time and adding the average value to the second signal.

Means for accomplishing the steps of the above process are also provided, including analog electronic means.

The average value obtained by the method and means of the present invention is equal to the shift in the second signal relative to the first signal due to the difference in the amplitude of the signals. Addition of this average to the second signal will restore a synthetic D.C. component to the second signal to compensate the second signal for the shift caused by a.c. coupling. This in turn will provide the correct relative magnitudes for the first and second signals.

If the signals are the outputs from detectors in a parallel scanning device, the outputs from the various detectors are ordered in some sequence and the output from each detector is processed as indicated above with the immediately preceding output in the sequence until all detector signals have been processed.

DESCRIPTION OF THE PREFERRED EMBODIMENT

Figure 1:
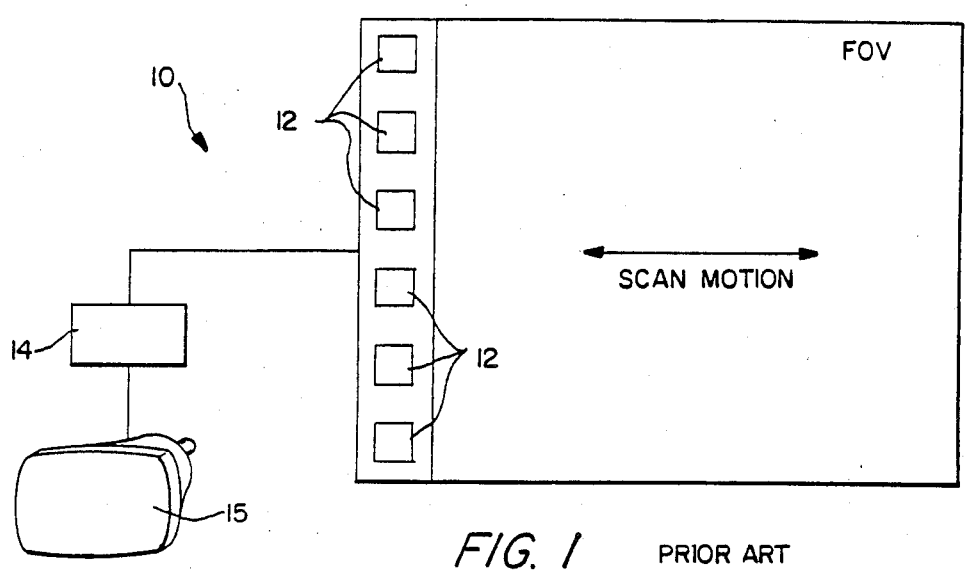
FIG. 1 is a schematic of a prior art parallel scanning detector array and signal processing system.
Figure 2:
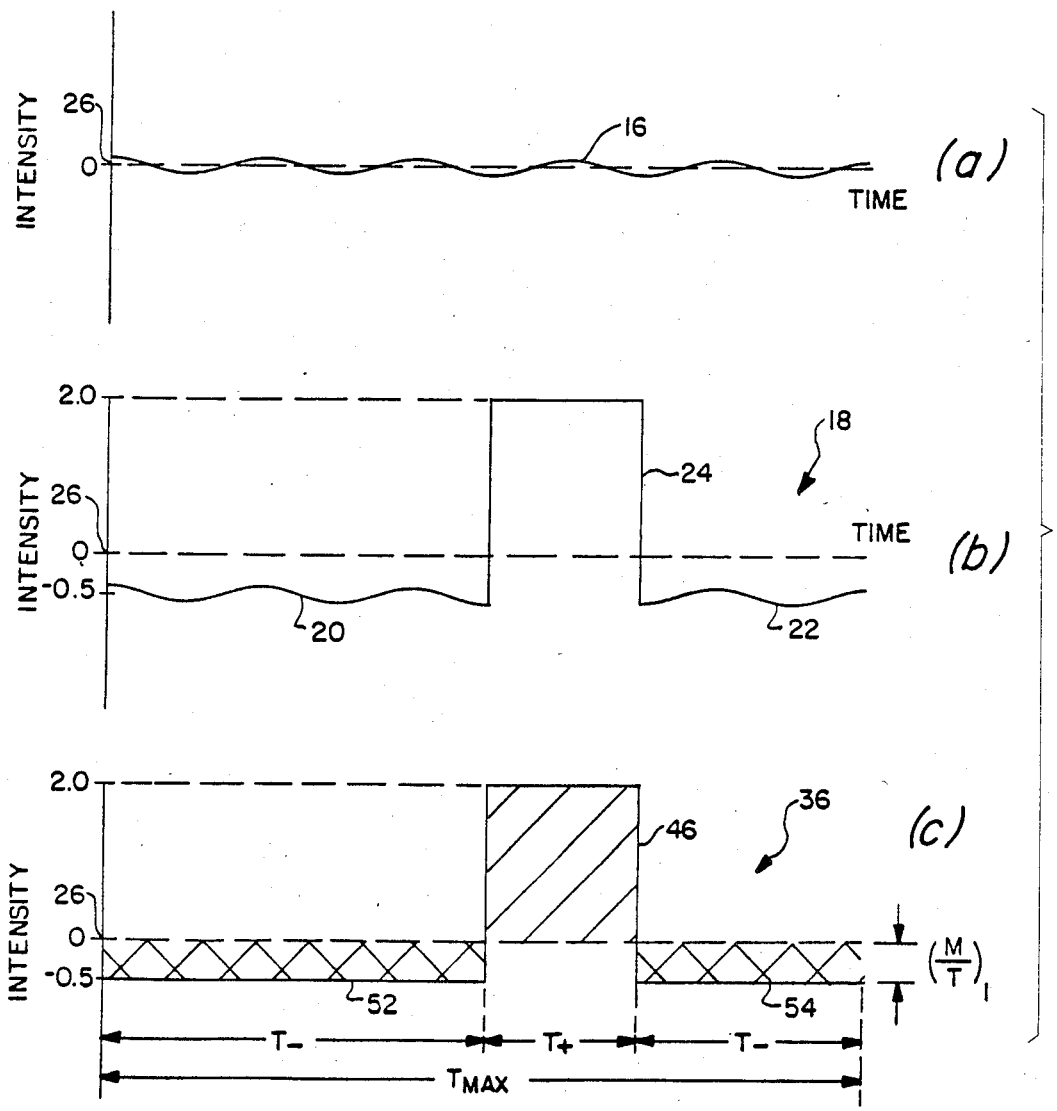
FIG. 2(a) shows the first output signal from a first detector of the array of FIG. 1 with its D.C. component removed.
FIG. 2(b) shows a second output signal from a second detector of the array of FIG. 1 with its D.C. component removed.
FIG. 2(c) shows a signal which is the difference between the signals of FIGS. 2(a) and 2(b).
Figure 4:
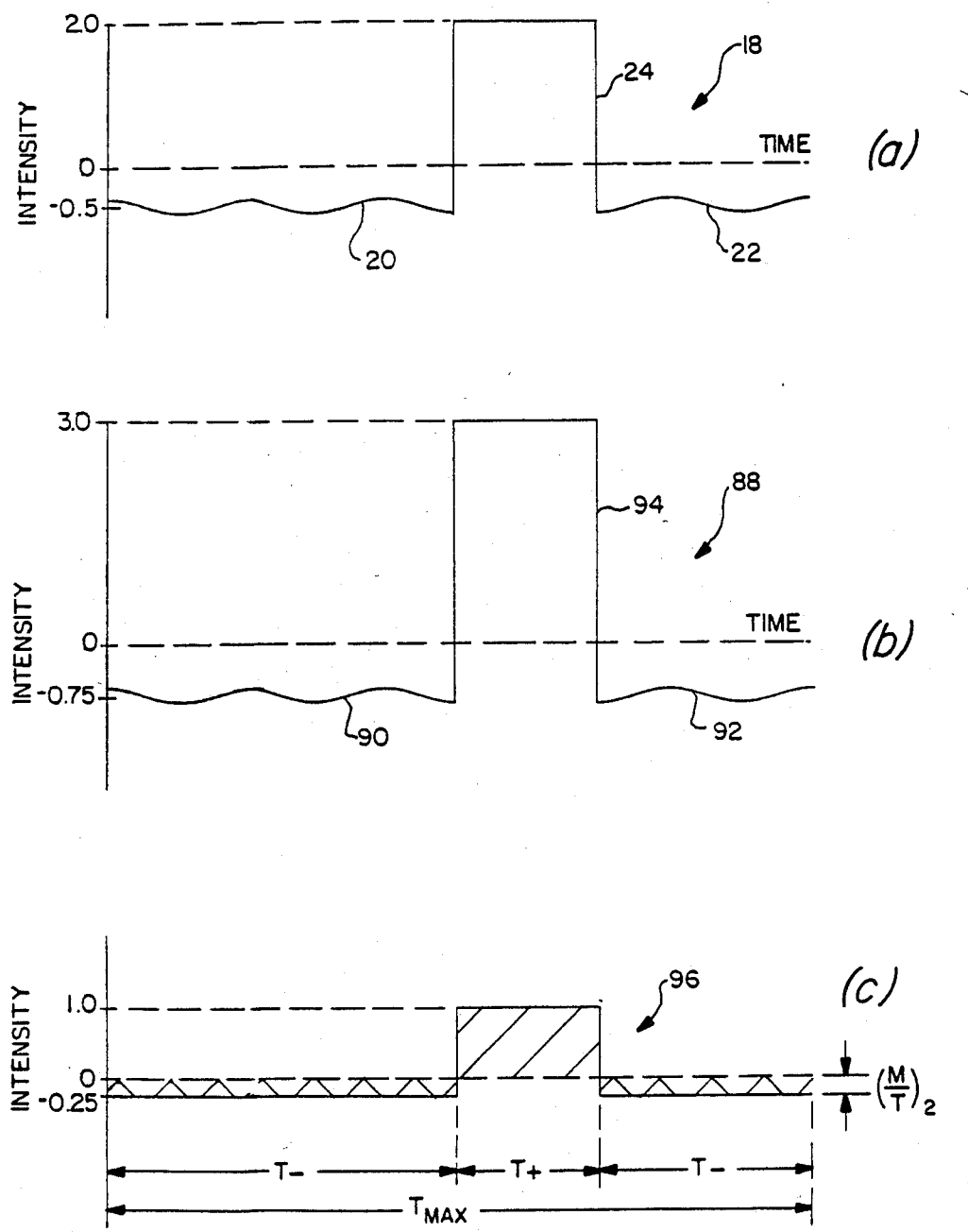
FIG. 4(a) is the same as FIG. 2(b), it is repeated for convenience.
FIG. 4(b) shows a third signal from a third detector of the array of FIG. 1 with its D.C. component removed.
FIG. 4(c) shows a signal which is the difference between the signals of FIGS. 4(a) and 4(b).

Signal processor 14 in parallel scanning device 10 (see FIG. 1) receives signals from each of a plurality of infrared detectors 12. FIGS. 2(a) and 2(b) depict signals 16 and 18, respectively, from two adjacent detectors 12 in array 11. All plots in FIGS. 2 and 4 are plots of signals from detectors 12 as a function of time. Each of signals 16 and 18 is proportional to the intensity of infrared light falling on one of the detectors 12 as the FOV is scanned.

Signal 16 corresponds to a background image. Signal 18 corresponds to an image of a hot object appearing in the FOV. Portion 24 of signal 18 depicts that portion of signal 18 corresponding to the hot object.

Both signals 16 and 18 have been a.c. coupled and therefore their D.C. components have been removed at the time they are input into signal processing means 14. Therefore, the average value 26 of signal 16 and 18 (as well as any other signals a.c. coupled from detectors 12 to signal processor 14) is the same. The magnitude of this average signal value 26 is arbitrarily designated as zero in FIGS. 2 and 4. Of course, the areas under signals 16 and 18 above average 26 must equal the respective areas under signals 16 and 18 below average 26. Thus, portions 20 and 22 of signal 18 lie below zero to compensate for hot spot 24. In FIG. 2(a), the area under signal 16 below average 26 is assumed to be equal to the area under signal 16 above average 26.

Figure 3:
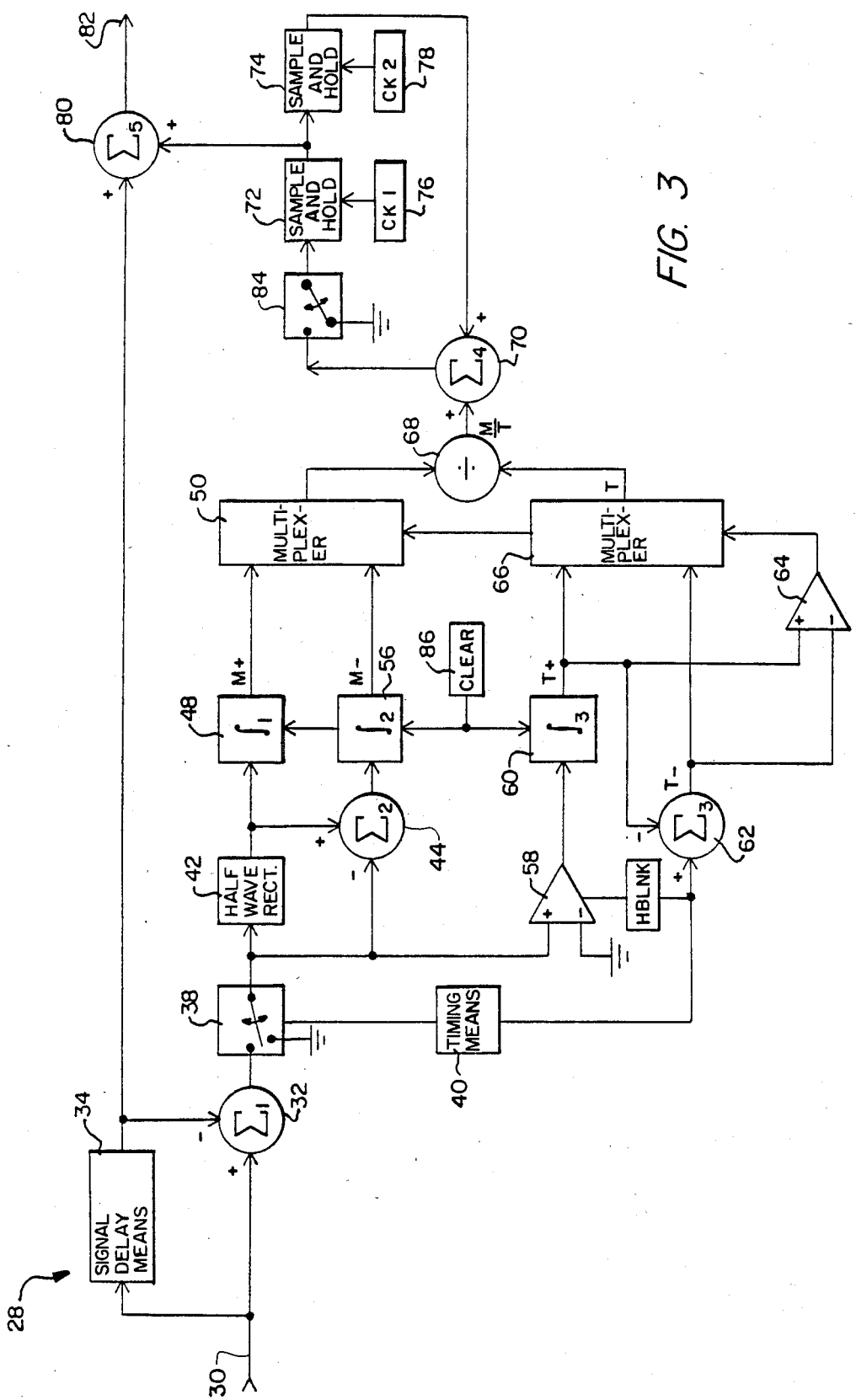
FIG. 3 is a schematic of a signal processing circuit in accordance with the present invention.

The time it takes array 11 to scan the FOV is called the scan time. In parallel scanning all detectors 12 scan simultaneously. A scan sequencer (not shown) is required to feed simultaneously produced signals sequentially to circuit 28 of FIG. 3. This can be done using scan conversion devices like vidicon storage tubes or by using semiconductor memories.

Circuit 28 is contained within signal processing unit 14. The structure and operation of circuit 28 will be illustrated first with signals 16 and 18, which have presumably been separated temporally by the scan sequencer. Signals from detectors 12 are coupled to circuit 28 at input 30.

Signal 16 is transmitted to first summer 32 and signal delay means 34. Delay means 34 is adapted to delay transmission therefrom of signal 16 for one scan time. In this example, it is assumed that signal 16 is the first signal input into circuit 28, therefore summer 32 will not have two different signals to process until the second signal, i.e., signal 18, is input at input 30. When signal 18 is coupled into circuit 28, delay means 34 will output signal 16. Signal 18 will be added to the inverse of signal 16 by summer 32. This generates a signal 36 which is the difference between signals 16 and 18 (see FIG. 2(c)).

Signal 36 is transmitted to switch 38. Switch 38 is selectively connected to timing means 40 and is adapted to be closed during scan times and open when array 11 is retracing (i.e., the horizontal blanking interval). When closed, switch 38 transmits signal 36 to half wave rectifier 42 and second summer 44. Half wave rectifier 42 transmits only the positive portion 46 of signal 36 to integrator 48 and summer 44. Integrator 48 integrates portion 46 over time to yield value M+ and transmits M+ to first multiplexer (MUL 1) 50. Summer 44 adds portion 46 to the inverse of signal 36 to thereby input the absolute value of the negative portions 52 and 54 of signal 36 to second integrator 56. Integrator 56 integrates portions 52 and 54 over time to yield value M− and transmit M− to first multiplexer 50.

When closed, switch 38 also transmits signal 36 to first comparator 58. Comparator 58 provides a first logic signal (e.g. a 1) when signal 36 is positive and a second logic signal (e.g., is 0) during horizontal blanking. The output of comparator 58 is integrated by a third integrator 60. The output T+ of integrator 60 is proportional to the time that signal 36 is positive.

T+ is transmitted to third summer 62 which inverts T+ and adds it to the total time Tmax of signal 36. The output of summer 62 is thus the time that signal 36 is negative, i.e., T−. T+ and T− are transmitted to a second comparator 64 and to a second multiplexer (MUL 2) 66. Comparator 64 gives a first logic signal (e.g. a 1) if T+ ≧ T− and a second logic signal (e.g. a 0) if T+ < T−. The output of comparator 64 is transmitted to multiplexer 66 to select the larger of T+ or T− and transmit this larger time signal T to divider 68.

The output of comparator 66 is fed to multiplexer 50 from multiplexer 66 to also select the integral value (M+ or M−) corresponding to the selected larger time signal T (i.e., M+ is selected if T+ ≧ T− and M− is selected if T− < T+). This corresponding integral value M is transmitted from multiplexer 52 to divider 68. Divider 68 forms M/T and transmits that signal to a fourth summer 70 (the various values of M/T will be labeled (M/T)i where i indicates which quotient is being indicated, e.g. the first quotient derived from a first and second signal is (M/T)1).

For signal 36 in FIG. 2(c), comparator 64 would output a zero and therefore T would equal T− and M would equal M−. Thus, (M/T)1 would then represent the average of signal 36 during times when signal 36 was negative, i.e., (M/T)1 is the negative average of signal 36.

FIG. 2(c) shows that (M/T)1 is 0.5 (in arbitrary units). The sum generated by summer 70 is the DC shift which must be added to signal 36 to restore signal 36 before it is transmitted to video screen 15.

Two sample and hold units (SH 1 and SH 2) 72 and 74 are used in a master/slave configuration. Clock 76 controls sample and hold 72. Clock 76 goes low during horizontal retrace times and sample and hold 72 stores the output from summer 70. Clock 78 controls sample and hold 74. Clock 78 follows clock 76 and is non-overlapping. When clock 76 goes high it opens sample and hold 72 and the contents thereof are transmitted to a fifth summer 80 and sample and hold 74. Summer 80 adds the contents of sample and hold 72 to signal 18. Signal 18 is transmitted to summer 80 through delay means 34. Clock 76 is set to delay dumping of the contents of sample and hold 72 until signal 18 is transmitted to summer 80. The output of summer 80 is transmitted to output 82 which is electrically connected to video screen 15.

After the contents of sample and hold 72 are dumped, sample and hold 74 transmits those contents, e.g., (M/T)1, to summer 70 where the contents are added to the next quotient, e.g., (M/T)2. Thus, the output of summer 70 is equal to:

$$\sum_i \left(\frac{m}{T}\right)_i \qquad (1)$$

where i is the number of the quotient being computed (equal to a maximum of N−1) and N is the number of detectors 12 in array 11.

Summer 70 therefore provides a synthetic DC cumulative offset or shift which is to be added to the successive signals from detector array 11 which are sequentially fed to signal processing means 14 by the scan sequencer.

Sample and holds 72 and 74 are cleared every frame by grounding switch 84. That is, after each detector 12 has transmitted its signal to circuit 28 and each signal has been processed and output, the cumulative DC shift or offset is initialized to zero. Clearing means 86 is employed to clear integrators 48, 56 and 60 during horizontal retrace time. This clearing occurs after sample and hold 72 has held its data.

FIG. 4(b) illustrates processing of a third signal 88 from one of the detectors 12 which is adjacent to the other of detectors 12 which produced signal 18. Signal 88 has three portions 90, 92 and 94 with portions 90 and 92 being negative and portion 92 representing a hot spot which is hotter than portion 24 of signal 18. Signal 18 is reproduced in FIG. 4(a) for convenience. FIG. 4(c) depicts a difference signal 96 generated by summer 34 which substracts signals 18 and 88. A second quotient (M/T)2 generated by circuit 28 is shown with magnitude 0.25 in FIG. 4(c). The area under portion 46 of signal 36 shown with diagonal lines is equal to the cross hatched area in FIG. 4(c). Circuit 28 will add (M/T)1 and (M/T)2 (i.e., −0.75 total) to signal 88 to restore signal 88 prior to outputting signal 88 to video screen 15. Note that sign is retained in equation 1.

A particular advantage of circuit 28 is that all components can be analog other than clocks 76 and 78. Examples of analog components which could be used in circuit 28 include employing LM318 operational amplifiers with 20 MHZ small signal bandwidths in all summers. Integrators 48 and 56 can include low offset LM356 BI-FET amplifiers with 20 V/μ sec slew rates and 4 MHZ bandwidths. Integrator 60 can be made with a LM 318 operational amplifier with a maximized slew rate (e.g., 150 V/μ sec) and minimized settling time (e.g., less than 1 μ sec). All integrators can use 4066 CMOS analog switches for clearing the integrators during retrace. Comparators 58 and 64 can be LM 319 dual comparators with eighty nano-second rise times. It is preferable to buffer the output of comparator 58 through a CMOS gate for strobing during blanking and to produce approximately a 0 or 5 volt output.

Switches 38 and 84 and multiplexers 50 and 66 can all be low-transient 4066 type CMOS switches. Divider 68 can be an Analog Devices 531 K transconductance analog multipler/divider with two μ sec settling time at one percent accuracy. Divider 68 can be easily be substituted for since the divider input is always bounded from one half Tmax to Tmax and the small range will not significantly effect most divider settling times. Sample and hold units 72 and 74 can be Datel SHM-LM-2 devices with 4 μ sec acquisition time.

Low noise circuit layout techniques are required for these analog circuits to minimize noise. Implementation of circuit 28 using all digital components is also possible, would require no adjustments and would be insensitive to offset signals prevalent in the above analog implementation. These analog offset signals produce unwanted errors which can be nullified by mechanical adjustment devices (potentiometers) and would not exist in a digital implementation.

Circuit 28 is particularly advantageously employed with forward looking infrared devices (FLIRs). Circuit 28 directly interfaces to any Common Module Forward Looking Infrared (FLIR) camera with an EIA Standard RS-343 video output format. However, the DC restoration method and means herein described is capable of providing synthetic DC restoration to almost any sequentially fed series of ac coupled electronic signals. The input signals can be generated by virtually any type of detector. Typically, but not necessarily, such input signals are generated by imaging systems. The only limitations of the present invention are that the hot or cold spots (i.e. portions of relatively large amplitude variation) on the scan line must appear on less than one half of the scan line, and the background (i.e. the portions of relatively small amplitude variation) cannot change rapidly between successively fed scan lines. The sequence of signals fed to processing system 14 need not necessarily come from adjacent detectors on array 11, but is convenient to do so, and in a particular case, may be necessary to avoid drastic changes in background signals between successive inputs.

The specific components described above are given by way of example only and circuit 28 is merely one embodiment of the present invention.

What is claimed is:

1. A method of processing a sequence of a.c. coupled electronic signals, each of duration t, comprising:
   selecting a first signal;
   selecting a second signal;
   generating a difference signal which is the difference between said first and second signals;
   determining a first time which is that portion of t when said first signal exceeds said second signal;
   determining a second time which is that portion of t when said second signal exceeds said first signal;
   selecting the larger of said first or second times;
   generating an average value of said difference signal during said larger time; and
   adding said average value to said second signal.

2. A method of processing electronic signals generated by detectors in a parallel scanning detection device having a scan time, and wherein said electronic signals are a.c. coupled to a signal processing system, comprising the steps of:
   selecting a first output from a first of said detectors;
   selecting a second output from a second of said detectors;
   generating a first difference signal which is the difference between said first and second outputs;
   determining the first time which is that portion of said scan time when said first output exceeds said second output;
   determining the second time which is that portion of said scan time when said second output exceeds said first portion;
   selecting a first larger time which is the larger of said first or second time;
   generating a first average value of said first difference signal which is the average value of said first difference signal during said first larger time; and
   adding said first average value to said second output.

3. The method of claim 2 further including:
   delaying said first output during scanning for one scan time.

4. The method of claim 2 further including:
   after said adding, selecting a third output from a third of said detectors;
   generating a second difference signal which is the difference between said second and third outputs;
   determining a third time which is that portion of said scan time when said third output exceeds said second output;
   determining a fourth time which is that portion of said scan time when said second output exceeds said third output;
   selecting a second larger time which is the larger of said third or fourth times;
   generating a second average value of said difference signal which is the average value of said difference signal during said second larger time; and
   adding said second average value to said third output.

5. The method of claim 2 wherein said first average value is generated by integrating said difference signal over said first larger time to produce a first integral; and
   dividing said first integral by said first large time to obtain said first average value.

6. A method of processing electronic signals generated by detectors in a parallel scanning device having a scan time, wherein said electronic signals are a.c. coupled to a signal processing system, comprising the steps of:
   identifying unique pairs of said electronic signals wherein one and only one member of each of said pairs is also a member of one and only one other of said pair;
   inputting each of said electronic signals sequentially into said signal processing system;
   generating a difference signal for each of said pairs after both members of said pair have been input into said signal processing system, which is the difference between the members of each of said pairs;

determining the first time for each of said pairs which is that portion of said scan time when a first member exceeds a second member of each said pair;

determining a second time for each of said pairs which is that portion of said scan time when said second member exceeds said first member of each of said pairs;

selecting the larger of said first or second times for each of said pairs;

generating an average value of said difference signal over said larger said first or second times for each of said pairs, wherein said average values are generated sequentially;

adding all of said average values generated prior to the generation of said average value for one of said pairs to the second member of said one of said pairs wherein said second member of said one of said pairs is put into said signal processing system after the other member of said one of said pairs; and adding said average value for said one of said pairs to said second member of said one of said pairs.

7. A method of processing electronic signals generated by detectors in a parallel scanning detection device having a scan time, wherein said electronic signals are a.c. coupled to a signal processing system and said method of processing includes a cycle, comprising the steps of:

selecting a first output from a first of said detectors;

selecting a second output from a second of said detectors;

generating a difference signal which is the difference between said first and second outputs;

determining a first time which is that portion of said scan time when said first output exceeds said second output;

determining a second time which is that portion of said scan time when said second output exceeds said first output;

selecting a first larger time which is the larger of said first or second time;

generating a first average value of said different signal over said first larger time;

adding said first average value to said second output, so that said cycle is completed; and repeating said cycle until all of said electronic signals have completed the steps of said cycle, with said second output processed during an immediately preceding cycle being the first output for a present cycle and said second output for said present cycle being one of said electronic signals which was not selected in any previous cycle.

8. A means for processing electronic signals generated by detectors in a parallel scanning detecting device having a scan time, and wherein said electronic signals are a.c. coupled to said processing means, comprising:

means for selecting a first output from a first of said detectors;

means for selecting a second output from a second of said detectors;

means for generating a first difference signal which is the difference between said first and second outputs;

means for determining a first time which is that portion of said scan time when said first output exceeds said second output;

means for determining a second time which is that portion of said scan time when said second output exceeds said first output;

means for selecting a larger time which is the larger of said first or second times;

means for generating a first average value of said first difference signal over said first larger time; and means for adding said first average value to said second output.

9. The device of claim 8, further including:

means for delaying said first output during scanning for one scan time.

10. The device of claim 8 wherein said means for generating said average value includes:

means for integrating said difference signal over said first larger time to produce a first integral; and means for dividing said first integral by said first larger time to obtain said first average value.

11. The device of claim 8 further including:

means for selecting a third output from a third of said detectors;

means for generating a second difference signal which is the difference between said second and third outputs;

means for determining a third time which is that portion of said scan time when said second output exceeds said third output;

means for determining a fourth time which is that portion of said scan time when said third output exceeds said second output;

means for selecting a second larger time which is the larger of said third or fourth times;

means for generating a second average value of said difference signal during said second larger time; and means for adding said second large value to said third output.

* * * * *

UNITED STATES PATENT AND TRADEMARK OFFICE
CERTIFICATE OF CORRECTION

PATENT NO. : 4,577,223
DATED : MARCH 18, 1986
INVENTOR(S) : ROBERT C. FITCH, ET AL.

It is certified that error appears in the above-identified patent and that said Letters Patent is hereby corrected as shown below:

Column 6, line 63, delete "pair" and insert in lieu thereof --pairs--.

Column 7, line 5, insert --of-- after "each", and delete "pair" and insert in lieu thereof --pairs--.

Column 8, line 52, delete "large" and insert in lieu thereof --larger--.

Signed and Sealed this
Eighteenth Day of November, 1986

Attest:

DONALD J. QUIGG

Attesting Officer      Commissioner of Patents and Trademarks